United States Patent
Schmidt et al.

(10) Patent No.: US 11,218,214 B2
(45) Date of Patent: Jan. 4, 2022

(54) PREDICTIVE MEASUREMENT FOR NON-TERRESTRIAL COMMUNICATION

(71) Applicant: IPCom GmbH & Co. KG, Pullach (DE)

(72) Inventors: Andreas Schmidt, Braunschweig (DE); Martin Hans, Bad Salzdetfurth (DE); Maik Bienas, Schoeppenstedt (DE)

(73) Assignee: IPCom GmbH & Co. KG, Pullach (DE)

( * ) Notice: Subject to any disclaimer, the term of this patent is extended or adjusted under 35 U.S.C. 154(b) by 0 days.

(21) Appl. No.: 16/967,223

(22) PCT Filed: Mar. 8, 2019

(86) PCT No.: PCT/EP2019/055863
§ 371 (c)(1),
(2) Date: Aug. 4, 2020

(87) PCT Pub. No.: WO2019/170866
PCT Pub. Date: Sep. 12, 2019

(65) Prior Publication Data
US 2021/0083760 A1    Mar. 18, 2021

(30) Foreign Application Priority Data
Mar. 9, 2018   (EP) .................................... 18160962

(51) Int. Cl.
*H04W 36/00* (2009.01)
*H04B 7/185* (2006.01)
*H04W 36/30* (2009.01)

(52) U.S. Cl.
CPC ..... *H04B 7/18504* (2013.01); *H04B 7/18508* (2013.01); *H04B 7/18513* (2013.01);
(Continued)

(58) Field of Classification Search
CPC ............ H04B 7/18504; H04B 7/18508; H04B 7/18513; H04B 7/18541; H04B 7/1851;
(Continued)

(56) References Cited

U.S. PATENT DOCUMENTS

| 2011/0195708 | A1  | 8/2011 | Moberg et al. |
| 2017/0230104 | A1* | 8/2017 | Purkayastha ......... H04W 48/20 |
| 2019/0082481 | A1* | 3/2019 | Ravishankar ........ H04B 7/1851 |

FOREIGN PATENT DOCUMENTS

| CN | 106604334 A * | 4/2017 | |
| EP | 2749082 A1 * | 7/2014 | ........ H04W 36/0094 |

(Continued)

OTHER PUBLICATIONS

International Search Report and Written Opinion for International Application No. PCT/EP2019/055863, dated May 13, 2019.

*Primary Examiner* — Dong-Chang Shiue
(74) *Attorney, Agent, or Firm* — Proi Intellectual Property US; Klaus Michael Schmid

(57) ABSTRACT

The present invention provides a method of operating a user equipment, UE device in communication with a non-terrestrial communication system comprising a plurality of transmission points, the method comprising in the UE device triggering a transmission of a measurement report dependent on a measurement by the UE device of a received signal parameter (1) of a signal received from a transmission point of the system and a comparison of the measured parameter with a threshold (2), the threshold varying according to a predetermined function dependent on an expected position of the UE device with respect to the transmission point.

12 Claims, 10 Drawing Sheets

(52) U.S. Cl.
CPC .... *H04B 7/18541* (2013.01); *H04W 36/0085* (2018.08); *H04W 36/30* (2013.01)

(58) Field of Classification Search
CPC . H04W 36/0085; H04W 36/00; H04W 36/30; H04W 84/06
See application file for complete search history.

(56) References Cited

FOREIGN PATENT DOCUMENTS

| | | |
|---|---|---|
| EP | 3120597 A1 | 1/2017 |
| WO | WO-2013115696 A1 | 8/2013 |
| WO | WO-2017189862 A1 | 11/2017 |

\* cited by examiner

PREDICTIVE MEASUREMENT FOR NON-TERRESTRIAL COMMUNICATION

CROSS-REFERENCE TO RELATED APPLICATIONS

This is the United States national phase of International Patent Application No. PCT/EP2019/055863, filed Mar. 8, 2019, which claims priority to EP 18160962.9, filed Mar. 9, 2018, the entire contents of each of each of which are hereby incorporated by reference herein.

FIELD OF THE DISCLOSURE

The present invention relates to the triggering of measurement reports in a non-terrestrial communications system such as a satellite communication system.

BACKGROUND

Satellite communication or satellite telephone systems are well known. An example is the Iridium telephone and data communication system.

Iridium uses low Earth orbit (LEO) satellites with six orbits and 11 satellites per orbit. The satellites have a height of 781 km and an orbital period of about 100 minutes which results in the time between two neighboured satellites in the same orbit passing the same point over ground is about nine minutes.

Currently the next generation of mobile communication standards (5G) in defined by 3GPP. It will define a network architecture for a core network (5GC) and a new radio access network (NR). In addition, access to the 5GC from non-3GPP access networks is provided. For general details of NR and 5GC we reference the description in previous inventions.

In 2017, a new activity started in 3GPP to include non-terrestrial access networks (NTN) support into NR. A new study was proposed in 3GPP Tdoc RP-171450 in which NTN are defined as networks, or segments of networks, using an airborne or spaceborne vehicle for transmission:
Spaceborne vehicles: Satellites (including low Earth orbiting (LEO) satellites, medium Earth orbiting (MEO) satellites, geostationary earth orbiting (GEO) satellites as well as highly elliptical orbiting (HEO) satellites) Airborne vehicles: high altitude UAS platforms (HAPs) encompassing unmanned aircraft systems (UAS) including tethered UAS and lighter than air UAS (LTA), heavier than air UAS (HTA), all operating in altitudes typically between 8 and 50 km, quasi-stationary.

The declared aim is an incorporation of NTN support into the NR. Thus, it is not proposed to allow known satellite communication technologies like Iridium to access the 5GC. It is proposed to include necessary enhancements into the currently developed NR standard to enable operation over the non-terrestrial vehicles described above.

This aim opens a wide range of innovation necessary to allow efficient communication between a UE and a NTN base station or an NTN transceiver.

The most likely deployment model for NTN NR base stations or transceivers are quasi-stationary HAPs and LEO satellites (LEOs). This invention enhances the incorporation of LEOs, MEOs and HEOs into NR.

A deployment model may be that LEOs are operated by a satellite operator who offers its NTN access to mobile network operators (MNOs) as a shared radio network access, as defined by 3GPP since 3G. The shared NTN RAN would complement the MNO's terrestrial RAN. Each satellite may contribute to the shared RAN in its current coverage area so that a shared RAN used by a specific MNO is offered by multiple satellites dynamically changing as the satellites follow their path through the orbit.

For NTN deployments in general, two architectural alternatives exist:
either the satellite constitutes a base station with all the typical base station intelligence. In this deployment, the base station is connected to a ground station via satellite link, the ground station connecting the satellite to the respective core network;
or the satellite basically constitutes a repeater who routes data between UE and a ground station which is the actual base station. This deployment is often called "bent pipe" deployment.

For the current invention, we use the model with a satellite comprising the base station if not otherwise mentioned. This is only to ease readability and should not cause any loss of generality. The ideas of this invention are valid for the bent pipe deployment as well.

From current NR standardization activities, a flexible parameterization is known for the physical layer, i.e. on a single carrier at the same time multiple transmission time interval (TTI) lengths or different subcarrier spacing values may be used, potentially even by a single UE.

In this context, the idea of bandwidth parts is currently being discussed in 3GPP. A bandwidth part may be formed within a given carrier by grouping of physical resource elements that are contiguously arranged in the time and/or frequency domain. Each bandwidth part may be configured with a different numerology, for instance in terms of sub carrier spacing, cyclic prefix, width (in frequency domain), length (in time domain), and so on. Furthermore, the assignment of the bandwidth part's physical resources to physical channels (used to transport data received from or destined for higher layers) and physical signals (information impressed or assessed directly at the physical layer, such as reference signals to perform measurements on) may vary from one bandwidth part to another. In future, there may be more than one bandwidth part per carrier, each with a different numerology and/or different physical resource assignments, and UEs may be configured to switch between one or more bandwidth parts during operation within a given carrier. Two or more bandwidth parts may even overlap in some scenarios in the time and/or frequency domain.

However, an automatic transition between physical layer parameters, and/or bandwidth parts based on expected link changes is not known or foreseen.

In order for base stations in cellular communication systems to decide on the best cell and best base station to serve a UE and to decide on candidate cells and timing for handover, carrier aggregation and multi-cell connections, a base station provides to a UE measurement configurations. This configuration comprises values to be measured, thresholds to be compared with measured values, measurement reporting details, such as trigger points and values to be included in measurement reports.

Typical values to be measured are the received signal strength (RSS, e.g. the value RSRP as defined in LTE) of the serving cell, the primary and/or secondary cells (in case of carrier aggregation applied), and neighbour cells. This received signal strength is the measured signal power of a pre-known reference signal transmitted by the base station typically without modulation or further coding with a fixed or pre-determined transmit power to allow a meaningful measurement on the receive side.

In case of LTE, three reporting criteria may be configured:
event triggered reporting,
periodic reporting, and
event triggered periodic reporting.

Typical event-based reporting triggers in LTE based on threshold comparison are the following which are similar in most cellular communication standard:
Event A1 (Serving becomes better than threshold)
Event A2 (Serving becomes worse than threshold)
Event A4 (Neighbour becomes better than threshold)
Event A5 (PCell/PSCell becomes worse than threshold1 and neighbour
becomes better than threshold2)
Event 131 (Inter RAT neighbour becomes better than threshold)
Event B2 (PCell becomes worse than threshold1 and inter RAT neighbour
becomes better than threshold2)
Event C1 (CSI-RS resource becomes better than threshold)

Typical reporting triggers in LTE based on comparison of two or more measurements are the following:
Event A3 (Neighbour becomes offset better than PCell/PSCell)
Event A6 (Neighbour becomes offset better than SCell)
Event C2 (CSI-RS resource becomes offset better than reference CSI-RS resource)

Furthermore, LTE allows configuration of periodic measurement reporting. This may be used, for instance, in context of the automated neighbour relation (ANR) functionality to let a UE regularly report (identifiers of) its strongest neighbour cells.

It is clear from the above that the comparison of a measurement sample according to prior-art is done either with a fixed configured threshold or with other measurement samples.

An example usage of events A1, A2 and A4 and/or B1 is the following: A base station configures a UE with a measurement event A2 and neither of A1, A4 and B1. As long as the receive signal from the serving base station is good enough, no measurement reports are sent.

When the A2 criteria is fulfilled, a measurement report is sent from the UE to the base station and the base station may re-configure the UE with neighbour cell measurements A4 and B1 including measurements gaps which may be required by the UE to perform the neighbour cell measurements and which will require radio resources and thus decrease efficiency. In addition, the base station may configure event A1 to detect when the serving base station is good again and, when A1 triggers a report, eliminate A4, B1 and the measurement gaps and thus bring efficiency to its former level.

In Idle mode, a UE autonomously selects a cell to camp on, i.e. a cell on which the UE listens to paging messages and from which the UE request a connection setup if required. The UE is typically configured with a list of cells it shall measure (neighbour cell list), while the UE may autonomously search for and detect other candidate cells based on stored information and depending on the UE implementation. The UE usually performs neighbour cell measurements as soon as the RSS of the serving cell falls under a threshold.

US 2011/0195708 A1 describes a measurement configuration comprising measurement instructions that demand the UE to perform RSS measurements of neighbour cells or send measurement reports depending on a neighbour cell status. The measurement reporting is thus not only dependent on the measured value itself (as in the prior-art of usual cellular communication systems) but also on additional information received while the measurement configuration has already been applied. This document does not describe any measurement configuration that is dependent on time or a relative position of a satellite, nor does it describe a variable (i.e. time-varying) threshold or offset values for triggering measurement reports.

WO 2013/115696 A1 describes a method of performing cell measurements in which thresholds are used for a serving cell and a neighbouring cell with a determining of the thresholds being based on a monitored cell load. As a UE changes position, signal strength changes with time but no prediction of a signal strength value is derived resulting from a known time-variant function.

WO 2017/189862 describes handoff in a satellite communication system. A user terminal may request handoff information from a ground network, including timing for handoff to a particular satellite.

For satellite connections to a 5GC in a NR framework, the path loss and therefore the link quality of a UE-to-satellite connection follows a pre-determined increase and degradation as the satellite flies over a UE along its orbit. For a flat angle of the UE-to-satellite line over horizon, the link quality may suffer from greater distance between UE and satellite comprising a long way through the troposphere with high absorption rate. In areas with steeper angle the distance is shorter and absorption rate is lower, thus the link quality is increased.

During a flyover of a satellite serving a ground-based UE, the above changes of link quality are known or pre-determined, i.e. there is no reason to measure these effects and trigger resulting measurement reports. The changes are also periodic, as usually a UE having a communication connection via LEO satellites is served consecutively by several satellites flying over the UE along the exact same or similar relative orbit. Orbits may only be similar and not exactly the same between satellites because of the rotation axis being slightly declined against the polar axis, but the effect is essentially negligible and accordingly is ignored in this specification.

It is not known to provide any means for measurement configuration, measurement performance and measurement reporting that is adapted to pre-determined long-term link changes. Also, it is not known to provide any means to cope with efficient measurement and reporting mechanisms for pre-determined periodic link changes.

GENERAL DESCRIPTION

It is an objective of this invention to provide a measurement regime for cellular communication UEs that is optimized for measurements of satellite base stations or satellite transceiver stations connecting UEs to ground-based base stations.

In the following, the term "ground-based UE" denotes a UE that is on the ground and stationary or that is near the ground and quasi stationary in relation to its distance to a satellite and in relation to the satellite speed. That is, a plane traveling at a typical travelling height of about 10 km and travelling speed of up to 1000 km/h is also considered a ground based UE.

The present invention provides a method of operating a user equipment, UE device in communication with a non-terrestrial communication system comprising a plurality of transmission points, the method comprising in the UE device triggering a transmission of a measurement report dependent on a measurement by the UE device of a received signal parameter of a signal received from a transmission point of the system and a comparison of the measured parameter with a threshold, the threshold varying according to a predetermined function dependent on an expected position of the UE device with respect to the transmission point.

While in a preferred example, a satellite based communication system is referred to, unless otherwise apparent, the invention is not so limited. A network transmission point may be in the form of a satellite or an airborne transceiver.

One aspect of the invention is a measurement reporting that triggers measurement reports being sent by the UE based on variable thresholds, the thresholds being defined or configured so that they follow a known or predetermined change corresponding to a trajectory of a satellite flying over the UE.

In this aspect there is a configuration of such measurement reporting in a UE by a base station defining characteristics of predetermined changes of a UE-to-satellite link. The characteristics are provided to the UE in one or more measurement configuration messages as a description of a function, as an indicator of one out of multiple predetermined candidate functions, as parameters for a pre-determined function or as any combination thereof.

The so described function may be applied to a threshold value before comparison with a measured value. Alternatively, the so described function may be applied to a measured value before comparison with a configured threshold.

A further aspect of the invention is a measurement reporting that triggers measurement reports being sent by the UE based on comparison of multiple measurement values of signals of different satellites, wherein different characteristics are applied to measurements of different satellites before comparison of the resulting values. This allows measurements of different satellites to be adapted, e.g. normalized, with respect to their respective trajectory relative to the UE before being compared.

An alternative or additional variation of this aspect is the comparison of two measurement values from different satellites using an offset, e.g. as in the measurements A3, A6 and C2 described above. The variation configures the offset dynamically along pre-determined characteristics configured as a function or parameters. The definition of a dynamic offset allows for example adaption of a measurement comparison between satellites to increase the likelihood of handover to satellites for which short-term increase of link quality can be expected or which are on a preferred orbit.

Another aspect of the invention is a varying configuration of physical signals to perform measurements on (reference) signals based on predetermined changes of a UE-to-satellite link (e.g., in context of the bandwidth part concept described above).

A still further aspect of the invention is related to determination of applied threshold or offset parameters in a combination of three steps: firstly, a general configuration of measurements based on stages of a flyover trajectory by the base station takes place, i.e. a configuration independent of a current stage of a satellite relative to a UE; secondly, a determination of a position of a specific satellite relative to the UE, i.e. a current stage of the satellite is determined in the second step; thirdly, an application in the UE of configured measurement parameters based on the general configuration and the current stage of the satellite.

According to this aspect, in a first step the base station may configure characteristics of a predetermined change of a link in relation to a pre-determined stage which is not necessarily the current stage of the UE-to-satellite link at the time the configuration takes place. In simple words, the base station configures link characteristics at different times of a flyover of a satellite, the different times being relative to a start time which may correspond to the certain start angle of the UE-to-satellite line over horizon or a similar virtual starting point.

The second step is a determination of a point on the flyover trajectory of a satellite relative to a UE on which the satellite is currently present. In other words, this aspect provides means to determine a current stage of a satellite relative to the UE which is related to a stage of the UE-to-satellite link.

The estimation for the second step may be done using UE internal measurements, e.g. link changes over time, Doppler frequency or changes thereof, angle of arrival or changes thereof, comparison of the measurements between different satellites etc. The estimation may also take into account the time, e.g. based on a known start time for definition of the characteristics. The estimation may also be calculated from the geographical position of the UE, e.g. from GPS coordinates, and the knowledge of the satellites orbits and movements. The estimation may also take into account information broadcasted by the satellite, e.g. its position, the current time or neighbour satellite positions.

The estimation of the actual position may be performed by the UE autonomously, or the base station may, after providing the characteristics in the above-mentioned generic way, determine the current position of the satellite on its flyover trajectory relative to the UE and provide the information to the UE.

The current stage is used in a third step to determine the parameters or functions actually applied for comparison of a measurement value with a threshold or comparison of two measurement values of different satellites.

Another aspect of the invention is a recurring application of the configured link characteristics for measurements in recurring flyover periods of different satellites along the (basically) same trajectory. That is, the measurement configuration stays valid for multiple periods of satellites serving a UE. This aspect may be advantageously combined with the former aspect of defining characteristics in a generic way. After a handover, the base station, e.g. the target base station in the target satellite, may simply provide its estimated current position relative to the UE so that the UE can apply the measurement configuration received earlier, now aligned with the trajectory of the target satellite. Alternatively, the UE can after handover autonomously estimate the current stage of the UE-to-satellite link and apply the generic measurement configuration adapted to the current relative satellite position.

The above aspect may also be combined with multiple different generic characteristics being configured by the base station to the UE, e.g. each generic characteristic relating to satellites of a specific orbit. Considering a UE being served alternately by satellites from two different neighbouring orbits, for each orbit there may be configured generic characteristics. After a handover, the target base station may provide its estimated current position relative to the UE including an indication which of the configured characteristics to be applied by the UE, i.e. which orbit the satellite is in. Again, alternatively, the estimation of a current position and potentially also the orbit a satellite is in may be done by the UE autonomously to determine the measurement characteristics to be applied.

An additional aspect of this invention is a deferred measurement configuration based on the variable measurements described above. This aspect proposes a base station may configure first measurements and first measurement reporting criteria with variable thresholds or offsets and second measurements and second measurement reporting criteria which are deferred. The second measurements and reporting criteria are configured together with a time information so that the UE performs these measurements and reporting only from the respective point in time given by the time information onwards. The second measurements may be aligned to measurement gaps in UL and/or DL direction to allow a UE to perform the measurements. The gaps may be present in DL, i.e. the base station may stop DL transmission, only from the indicated point in time, i.e. DL measurement gaps are deferred as the measurements themselves. As well, in the UL the UE only be allowed to include gaps, i.e. not transmit, from the indicated point in time, i.e. UL gaps are deferred.

This aspect allows a base station to configure measurements based on variable thresholds or offsets so that the base station is informed about deviation of the UE-to-satellite link from an expected progression. In addition, the base station configures for example neighbour cell measurements and respective gaps for the moment, when the link is expected to worsen below a certain threshold. With such a configuration, the UE will start neighbour cell measurements and use gaps autonomously and the base station can rely on the UE to inform about unexpected changes to enable a change of measurements, gaps and/or other configurations.

With this measurement configuration, it is possible to save radio resources as well as computational resources in the UE and the base station for performance and reporting of measurements while at the same time ensuring the base station is permanently informed about the quality of the respective link. Clearly, if all changes of link characteristics follow their expected path, the information about the link quality is implicitly derived by the base station from the absence of measurement reports.

A yet further aspect of this invention is for a base station to configure a time-varying periodic measurement reporting. The base station may alter the amount of measurement sample to be collected and/or the periodicity of measurement reporting between different stages, e.g. more frequently in problematic stages and less frequently during ideal conditions, thereby reducing the overall number of measurement samples to be collected and/or measurement reports to be sent.

Another related aspect is an autonomous handover triggering in the base station without the trigger of a measurement report simply based on the implicitly derived knowledge in the base station when a neighbour cell is expected to be better than a serving cell and no measurement report has been received that informs about unexpected situations. This may be triggered purely by time, i.e. the base station sets a timer and upon expiry of timer, the handover is initiated. The reception of a measurement report from the UE while the timer is running may change, reset or stop the timer, depending on the provided measurements.

In a similar way, the base station may also use this mechanism for carrier aggregation or dual connectivity scenarios. In both, carrier aggregation and dual connectivity, the UE connection to the network constitutes in parallel multiple carriers. In carrier aggregation, the multiple carriers usually connect the UE to the same base station or to two base station with a low latency connection (fibre or same hosting machine). In dual connectivity, the carriers connect the UE to different base station with a non-ideal connection, which may be used for a UE connection to two satellites in parallel. In that case, one satellite spans the master cell, the other (or others) span the secondary cell(s). The base station may, according to this invention, rely on measurements from the UE to be informed about unexpected signal strengths and thus add or release secondary carriers based on a timer and the absence of measurement reports.

A base station may for example ad a carrier to a link that is already setup to a first satellite, the new carrier being to a second satellite. The addition may be based on the knowledge that the second satellite will be in reach and with sufficient link quality at a certain point in time as long as the UE does not provide a measurement report stating the opposite. Similarly, the base station may release carriers to second satellites in parallel to a first link to a first satellite based on the knowledge of the trajectory of the satellite and the corresponding link changes.

The base station may also, as an alternative to the aspect described above, configure the UE to add or release carriers to a connection based on time, the point in time for carrier addition or release being determined by the base station based on a pre-determined relative movement of the satellite to a UE. The UE will then add or release carriers at the configured time without additional triggers like a reconfiguration from the base station. The base station will synchronously add or release the carriers so that transmitter and receiver are in synch. The UE may be configured to refrain from using a configured additional carrier based on measurement values and instead transmit a measurement report to inform the base station about the situation.

Another aspect of the current invention is a usage of the aspects above in the UE when the UE autonomously performs neighbour cell measurements for cell reselection, e.g. in idle mode. The UE may be configured to perform measurements for cell reselection, i.e. satellite reselection, only at times when candidate satellites are expected to be in reach. Otherwise, the UE may save resources by omitting measurements, i.e. omitting to search for a neighbour cell that is known to be absent, even if the RSS of the satellite the UE currently camps on would trigger such search and respective measurements according to known arrangements.

BRIEF DESCRIPTION OF THE DRAWINGS

Preferred embodiments of the invention will now be described, by way of example only, with reference to the accompanying drawings in which.

DETAILED DESCRIPTION OF THE DRAWINGS

Figure 1:
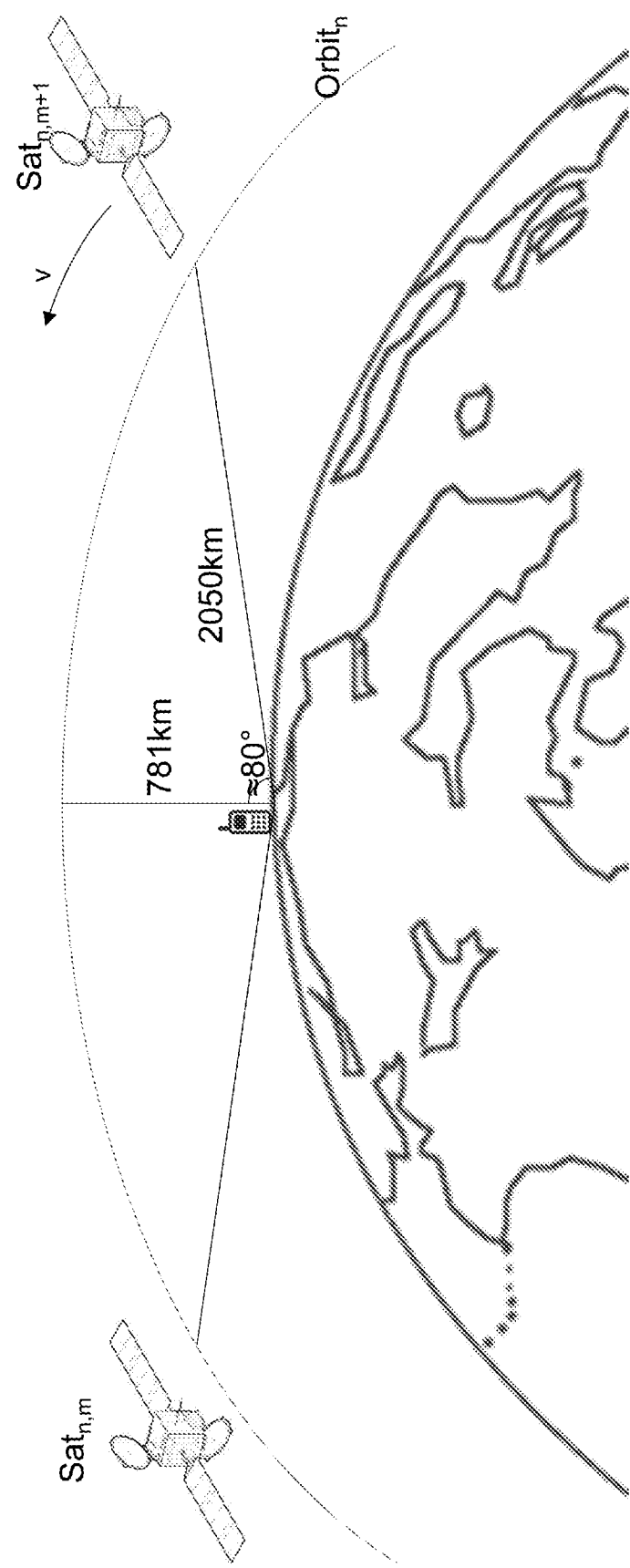
FIG. 1 illustrates a change in relative position between a UE and a satellite in orbit.

FIG. 1 shows an example radio access network based on LEO satellites. The figure depicts two satellites ($SAT_{n,m}$ and $SAT_{n,\,m+1}$), where the index m iterates the satellites on the same orbit (Orbit n). Example wise, two typical distances for LEO satellites are referenced in FIG. 1: the height of the satellites over ground (781 km) and the typical distance of a satellite that becomes visible by a ground based point at typically about 10° over the horizon (2050 km).

In the example setup, the time between a satellite appearing at the horizon and the same satellite disappearing on the opposite side is nine minutes. It is apparent from FIG. 1 that the link between a ground based UE and a satellite changes significantly in path loss and latency within these nine minutes in an essentially predictable way.

Figure 2:
FIG. 2 illustrates a satellite system with multiple satellites in multiple orbits.

FIG. 2 shows a similar example setup with two orbits (Orbit n and Orbit n+1), where the index n iterates all the orbits a satellite radio access network may comprise, e.g. typically six. On each orbit, only two satellites are shown (index m and m+1, respectively) where typically 11 satellites are present on the full 360°. The nearest satellites on neighbouring orbits may be offset by half the satellite distance on one orbit so that UEs that reside on the ground at a point between the orbit planes may be served by satellites of alternating orbits.

The setup of FIGS. 1 and 2 is an example similar to a LEO satellite based system currently deployed. The current invention is relevant as well for other setups with different numbers of satellites, different numbers of orbits, different inclinations of orbit, different height and satellite speeds etc.

Figure 3:
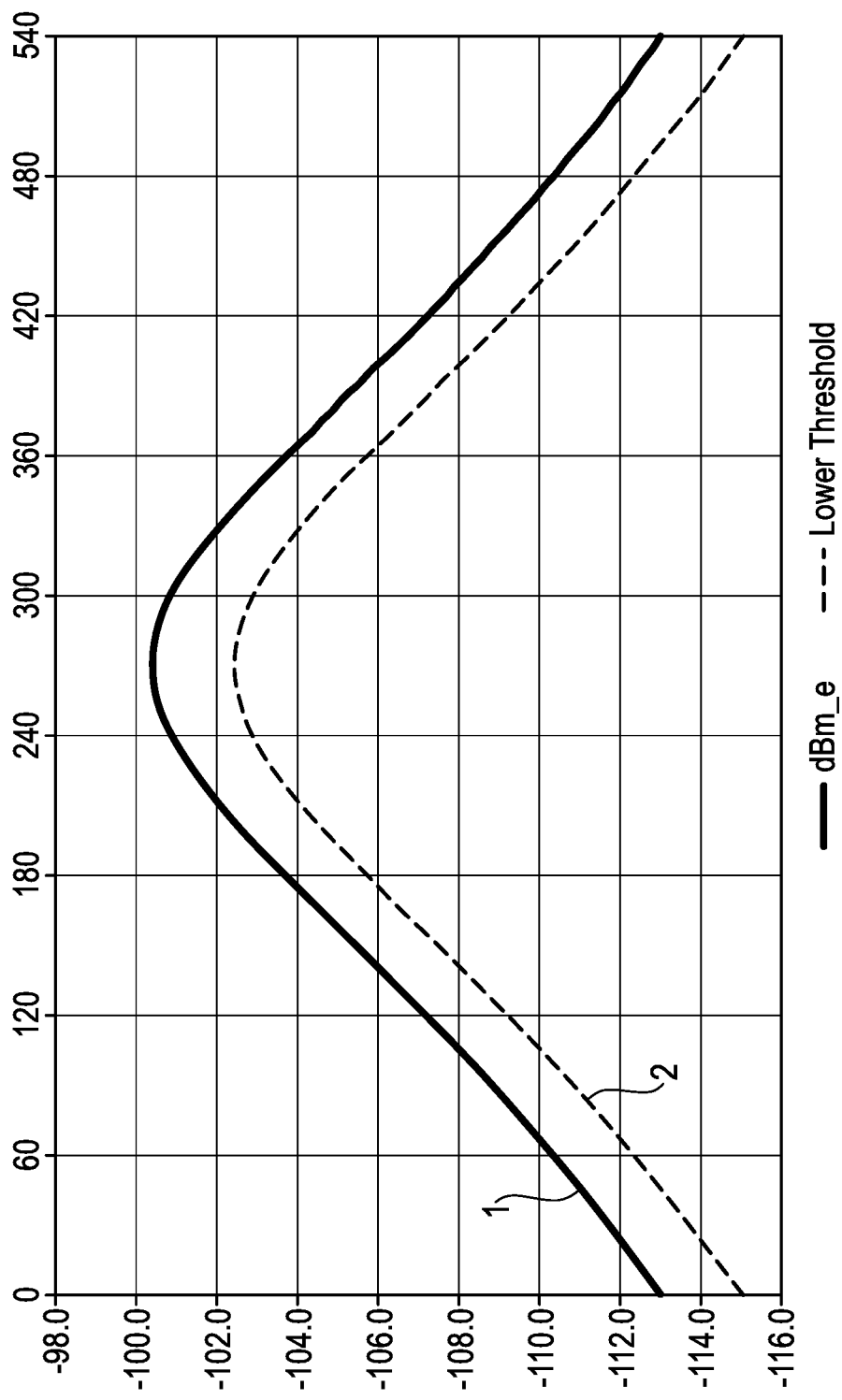
FIG. 3 shows a variation with time of a measured signal strength and a variable threshold.

FIG. 3 depicts a diagram showing an example for an expected received signal strength (RSS) in dBm over the time in seconds during a single flyover of a satellite (nine minutes), shown as a solid line 1. The figure assumes a geometry according to FIG. 1 and the following formula for the RSS ($dBm_e$).

$$dBm_e = dBm_0 - 10n \log_{10}(r/R),$$

where r is the current UE-satellite-distance according to the geometry in FIG. 1, R=2050 km is the max UE-Satellite-distance with maintained communication link, n=3 is the path loss exponent (n=2 is a vacuum LOS, n=4 is typical urban environment)

$dBm_0$ is the minimum RSS detectable by a typical UE, set to −113 dBm.

A UE may be configured by a base station to measure the received signal strength (RSS) of a link between the UE and a satellite serving the UE. Due to the known characteristics of the satellite movement, i.e. orbit and position thereon, the RSS may be expected to change as depicted in FIG. 3, solid line 1. According to this invention, the base station may configure a reporting event based on a threshold which threshold is configured to change over time as depicted in FIG. 3 with the lower dashed line 2. With that threshold configuration, the base station ensures it is informed whenever the measured RSS deviates significantly from its expected value.

The deviation that triggers the measurement reporting event may be configured as a fixed offset above or below the expected value (absolute value), a percentage above or below (relative value) or a combination thereof. Alternatively, a stepwise definition may be applied, i.e. a fixed or fractional offset valid for a specific time is applied, after which a different fixed or fractional offset is valid.

In the current example, the base station may be interested in an unexpected decrease of the current UE-to-satellite link, therefore according to FIG. 3, the threshold 2 dBm lower than expected may be configured. As a result, the UE would send a measurement report when the measured RSS falls under a measured value 2 dBm below the expected value.

The measured RSS may be smoothened by the UE by any known methods, i.e. by averaging multiple successive measurements. This is useful to avoid that a reporting is triggered caused by a short time signal degradation like fast fading, scattering or other environmental effects. Even the smothering function may be parameterized so that it is time varying according to a pre-defined or configured variation following the trajectory of a satellite.

For the configuration of the changing threshold by the base station to the UE, multiple alternative possible mechanism can be applied solely or in combinations.

A pre-defined function may be implemented in the UE and known by the base station, e.g.

$$dBm_{th}(t) = dBm_0 - 10n/2 \log_{10}(a - b \cos(t*j)),$$

with $dBm_0$, n, a, b and j being configured by the base station, and t being the time between reference time $t_0$ and the current time.

The reference time $t_0$ may be the time of reception of a configuration message from the base station or a fixed relative start time for a general description of the expected RSS.

Any of the constants above may be fixed, e.g. in a standards document, or configured, as described above, or they may be broadcasted by the satellite or any satellites of the satellite radio access network. The function used in the UE may be similar or different to the example above and more or less parameters may be used by a base station to configure the UE. In an alternative example, the main parameters may be fixed or broadcasted and only one or two additional parameters describing the individual expected RSS curve depending on the position of the UE are configured by the base station. In yet another alternative the main parameters are fixed or broadcasted and the UE calculates an individual curve progression from its own position relative to the satellite. In yet another alternative a function identifier is provided to the UE for the UE to select a predefined function from a pool of functions.

In the example of FIG. 3 the measured RSS may never significantly deviate from the expected value so that the base station knows the progression of the RSS and thus the characteristics of the UE-to-satellite link implicitly. If, for example, the base station needs to reconfigure the connection for higher data rate as soon as the RSS passes the −106 dBm threshold, the base station can assume this to happen at about t=140s without the need to exchange any measurement reports with the UE. This is a big advantage over prior art as any meaningful fixed threshold value as known from prior art would be crossed at some point in time as a result of the expected RSS progression with a measurement report being sent and the need for a measurement reconfiguration. The measurement report, however, would mainly report the obvious.

Figure 4:
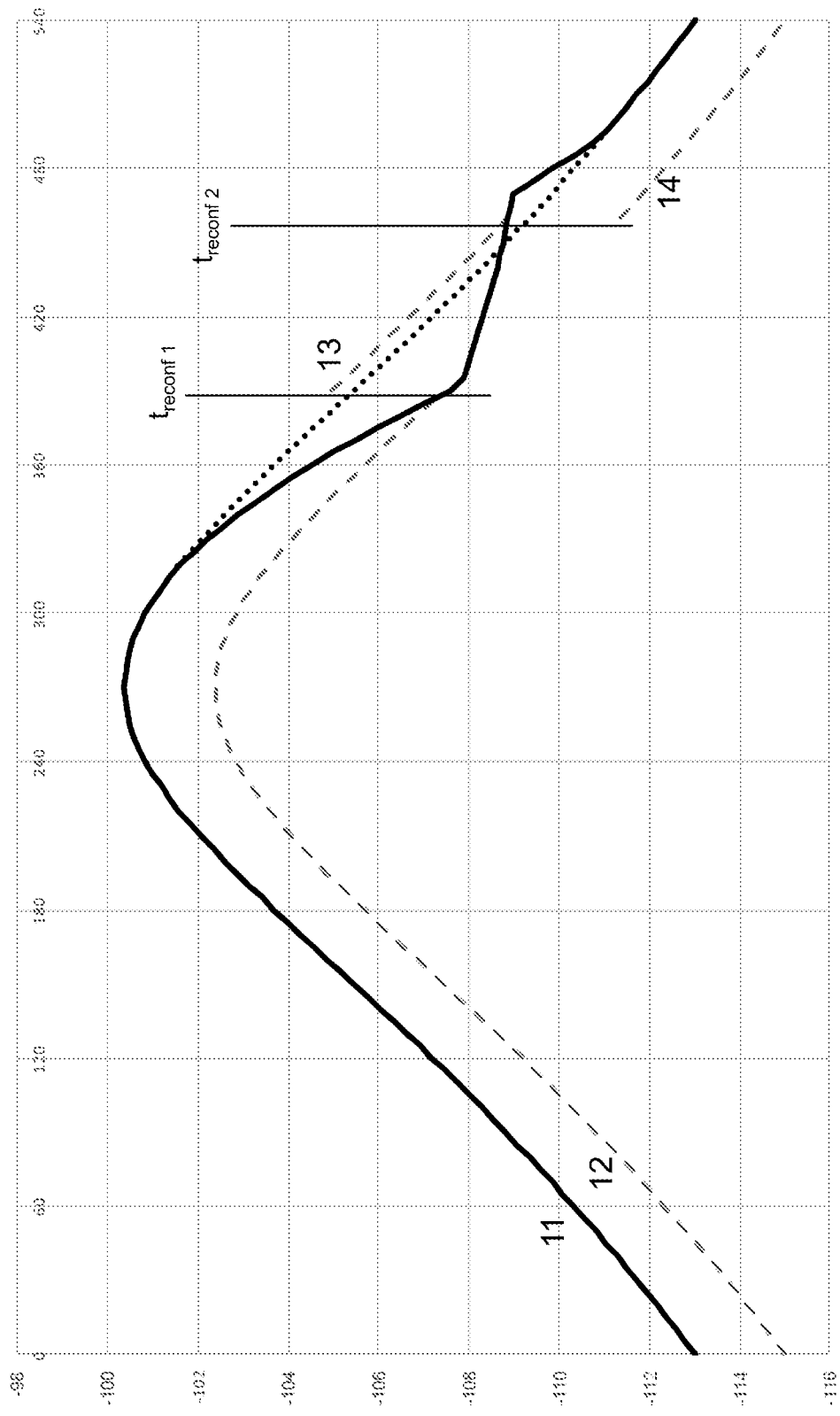
FIG. 4 illustrates a UE receiving a reconfiguration message after a signal strength falls below the threshold.

FIG. 4 depicts a different example of a similar setup and initial configuration as described with reference to FIG. 3. A UE may be configured to measure the RSS of its serving satellite and to trigger measurements reports whenever the measured value falls under the varying threshold shown in dashed lines 12. The measured value shown with a solid line 11 may progress for about 320s without significant deviation from the expected values (dotted line). Then the measured value decreases faster than expected and falls at a time $t_{reconf1}$ under the configured threshold. At that time, the UE will according to its reporting criteria, generate a measurement report including the measured value and transmit the report to the base station.

The measurement report may trigger the base station to re-configure the UE measurement reporting, e.g. with neighbour cell (neighbour satellite) measurements including information about handover candidate satellites to be measured and measurement gaps that enable the UE to perform the neighbour cell measurements. Additionally, the base station may configure a new event and threshold for serving satellite measurements, so that the UE reports when the serving satellite's RSS exceed a threshold according to the dashed line 13 of FIG. 4.

For the following approximately 80 seconds, the UE performs the configured measurements, thereby using the resources required, e.g. radio resources for measurement gaps and time for retuning the RF. At some point $t_{reconf2}$ later, the measured serving satellite RSS may have reached the threshold for reporting the good link quality and the base station may reconfigure the UE measurement criteria by eliminating the need to measure neighbour satellites including the respective gaps and by configuring a lower dynamic threshold (dashed line 14) for reporting of RSS falling under that threshold.

As clearly visible in FIG. 4, the steps of the invention of providing a dynamically changing threshold allow efficient and effective measurement reporting without reporting the obvious changes of a UE-to-satellite link.

Assuming a handover takes place for the UE to a target satellite with the same expected trajectory, the same configuration can stay valid, it is simply reset during the handover to re-start from the beginning of the situation shown in FIG. 4 or to a point in time representing the current stage of the link between UE and target satellite after handover (more about how to estimate that point follows further down).

Figure 5:
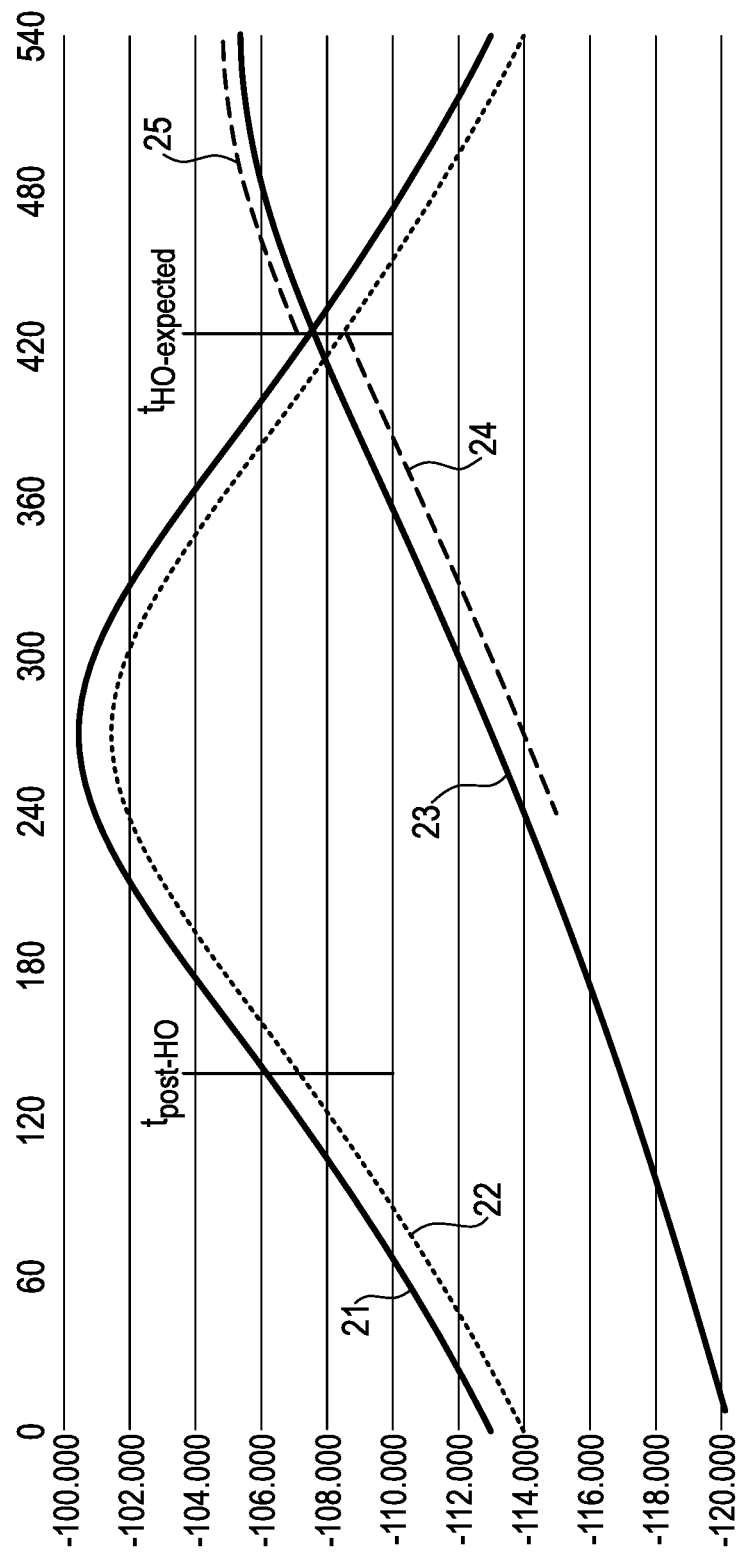
FIG. 5 illustrates measurements made on a serving station and a neighbouring station.

FIG. 5 depicts a similar graph as FIG. 4 showing the expected progression of a received signal strength in a UE over time for a serving satellite 21. In addition, FIG. 5 shows the expected RSS of a neighbour satellite, e.g. a satellite on a neighbour orbit 23. According to the aspect already described above, the base station may configure the UE with a measurement event based on the RSS of the serving satellite to fall under a threshold, the threshold progressing along a known or configured function 22, so that the base station can take the absence of measurement report to indicate an expected RSS.

According to one aspect of this invention, the serving base station may configure a UE to measure a neighbouring satellite and to compare measured RSS of the serving and the neighbouring satellite. The start of this neighbour cell measurement may, as depicted in FIG. 5, be deferred to a point in time when the base station expects the measurement to make sense. In the example, the UE may be configured to start neighbour cell measurements at about the time when the quality of the link to the serving satellite is expected to have its upper peak. Note that the configuration of the UE is expected to be done at an earlier point, e.g. around t=0s in FIG. 5 or within an earlier flyover period, so that the neighbour cell measurement is deferred in time according to one innovative aspect of this invention.

The deferred neighbour cell measurement may be accompanied by a measurement gap configuration also deferred to the same point in time so that respective measurements can be performed by the UE without re-configuration.

The comparison of the serving and neighbour cell may be configured so that a report is sent by the UE if the RSS of the serving base station falls by an offset under the RSS of the neighbouring cell. Assuming in an example situation the neighbouring cell to be measured as expected, solid line 23, the reporting criteria would verify whether the RSS of the serving cell falls under the curve shown in the figure as dashed line 24.

The expected progression of the serving and the neighbouring cell cross each other at a point in time denoted $t_{HO-expected}$ in FIG. 5. At around that time, the base station may trigger a handover because the link to the neighbour cell is better than that to the serving satellite. As one aim of this invention is to eliminate the necessity to transmit measurement reports reporting the obvious by the UE, the measurement criterion based on the serving cell RSS falling by an offset under the neighbour cell may be eliminated. This measurement criterion elimination is configured already at the point in time, when the neighbour cell measurement was configured, i.e. a measurement configuration varying over time was configured. In this example, the measurement configuration changes may be triggered by time. In other examples, any kind of measurements may lead to a change of the applied configuration, i.e. any measurements that allow the UE to estimate a state of the link or a position of any of the satellites relative to the UE (more about that, further down the invention).

An additional measurement reporting criterion may be configured by the base station so that its application is deferred by the UE to the time after the handover is expected. For example, as depicted in FIG. 5, the base station may request the UE to report from that moment onwards until a handover actually happens any situation in which the serving cell is received better than the neighbour cell by a second offset. Curve 25 of FIG. 5 shows the sum of neighbour cell RSS and the respective second offset. That is, from the moment when it can be expected that the neighbouring satellite can offer a better link, the unexpected opposite is reported by the UE (if it happens). This is for the situation that a handover has not yet happened and the neighbour satellite falls by the second offset under the serving cell so that the actual handover may still be deferred by the base station.

In other words, in this example embodiment of the current invention, the measurement reporting is configured to ensure only unexpected measurements are reported. As long as the serving cell is expected to be the best cell, measurement reports are triggered by the serving cell's RSS falling by an offset under the neighbour cell. As soon as the neighbour cell is expected to be the better cell, the measurement reporting is changed to be triggered when the neighbour cell's RSS falling by an offset under the serving cell.

The point in time that changes the applied measurement configuration is the expected handover point. However, the actual handover point is a base station decision which may be influenced by other parameters, e.g. neighbour cell occupation, available radio resources and compute resource of the base stations to trigger and perform the handover. Thus, the point in time of a handover may vary and thus the autonomous change of measurement configuration in the UE increases measurement efficiency and may increase handover performance in case the unexpected happens and the neighbour cell does not become the best cell at the expected point in time. The point in time the applied measurement configuration is changed is set by the base station and it may for example be earlier than the expected handover or it may be at the predicted crossing point of the two RSS curves but the actual handover is planned by the base station to be a short time instance later to ensure a sufficient neighbour cell signal quality. In all these cases, the invention provides means to apply efficient measurement reporting at a minimum signalling.

When the handover actually happens, i.e. when the base station triggers via a handover message, e.g. a handover command message, the UE to switch to the target satellite, the measurement configuration may be reset easily by the source or target base station or by the UE autonomously to the new relative state of the target satellite, e.g. to a point $t_{post-HO}$ in FIG. 5. Because of the periodicity of the curves, point $t_{post-HO}$ is depicted in the same figure, while actually point $t_{post-HO}$ follows point $t_{HO-expected}$. As a result, no neighbour cell measurements would be performed and related offsets are reset. During handover, the measurement configuration may alternatively be re-done by the target UE or it may be re-done only in parts, e.g. by updating the information about which neighbour satellite to measure (frequency/code) keeping the timing and offset information unchanged.

Figure 10:
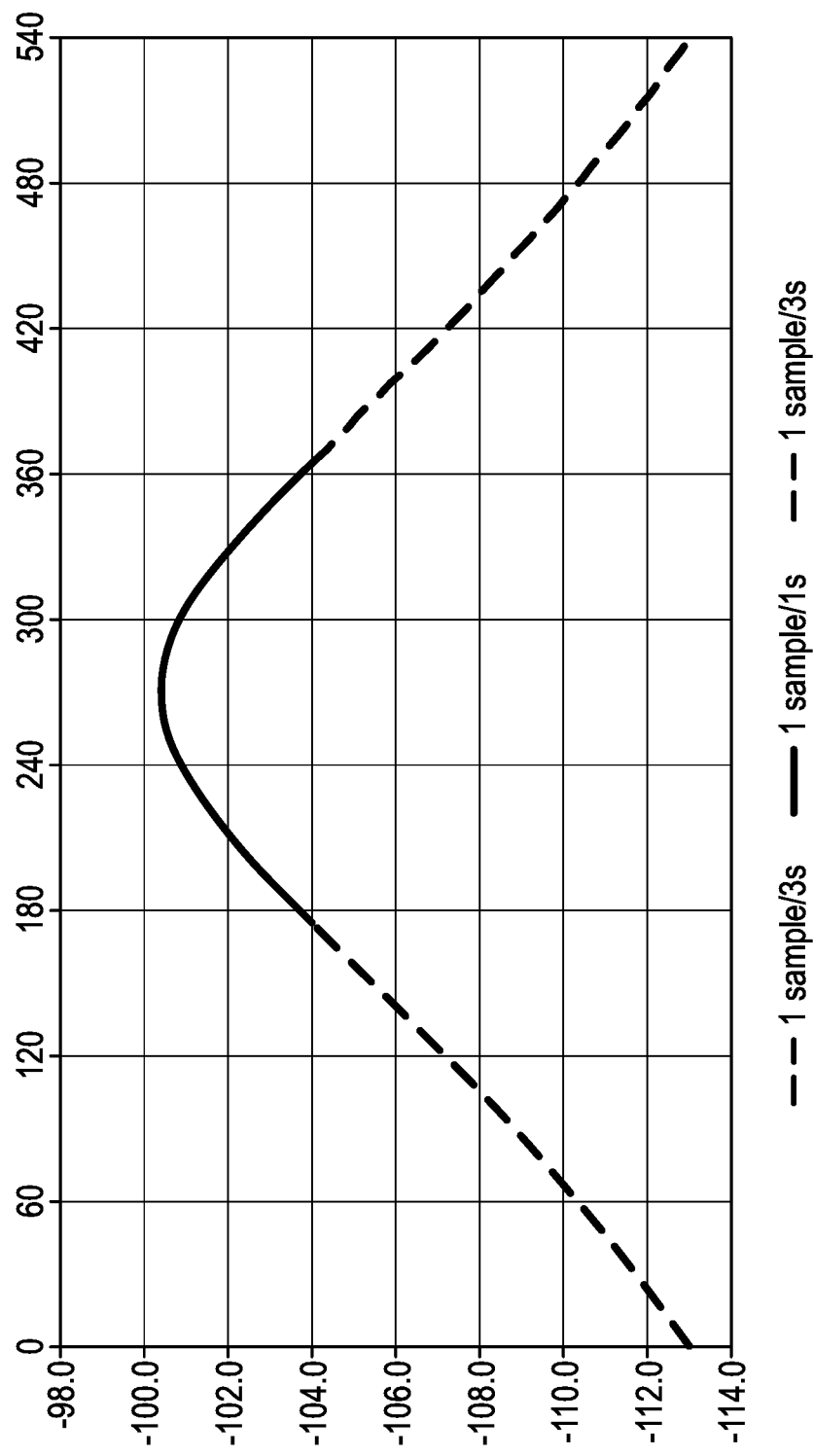
FIG. 10 illustrates how a measurement frequency may change with satellite position.

An embodiment of another aspect of the current invention is depicted in FIG. 10. The base station may configure periodic measurement reports in a UE, the periodicity or the number of measurement samples taken per time unit may be configured to vary over time. In the example of FIG. 10 two configurations may be provided to the UE, one to be applied during expected low link quality in first time intervals 0s<t<170s and 370s<t<540s and the other during a second time interval 170s≤t≤370s with expected high link quality. During the first time intervals (dashed line), the configuration may require the UE to transmit one measurement report comprising RSS measurements of the serving cell every second while during the second time interval (solid line) the UE may be required to only send one report every three seconds.

Another important aspect of this invention is the application of current and future measurement configurations by a UE based on a generic measurement configuration for a predicted flyover period of one satellite and an estimation of a current relative position of a satellite in the UE. Both, the configuration and the estimation enable the UE to apply the correct current measurement configuration parameters.

A generic configuration may comprise the different parameters that have been introduced by this invention based on a virtual flyover period of a satellite. The positions of the satellite on its trajectory may be denoted by the angle over horizon between UE and satellite, seen from the UE point of view. The angle may vary between 0° and 180°, whereas realistically usable angles may go from 10° to 170° at maximum. For a generic description, it is inevitable that UE and base station have a defined value interval, i.e. that base station and UE simply know what the configuration of parameters for different angles means. The base station may then configure different functions or parameters for different value intervals of the respective angle.

Alternatively, the configuration may use a flyover time, in the example satellites used herein going from t=0s to t=9 min=540s. Other satellite orbits may have shorter or longer times. The example of nine minutes flyover time was used for the figures showing example values of RSS, thresholds and offsets in this invention. The base station may then configure different functions or parameters for different value intervals of the difference of current time and a defined $t_0$=0 s.

Other values than time and angle may be used, e.g. some virtual fraction of the satellite path from 0% to 100% or similar.

Figure 9:
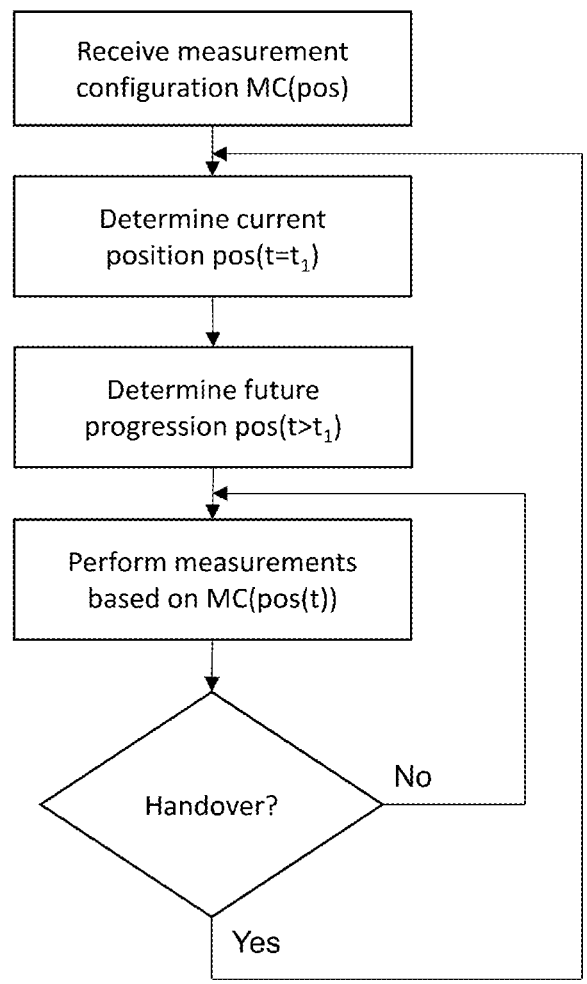
FIG. 9 shows an algorithm for position determination and measurement configuration for a single satellite.

FIG. 9 shows an example block flow for the described aspect of this invention. A UE may receive from a base station a measurement configuration MC that is a function of the position pos of a satellite relative to a UE. The function may be configured as described in various examples above, either as a function, parameters of a pre-determined function, in form of multiple measurement configurations applied consecutively or as stepwise defined thresholds and offsets.

The UE then determines the current position of the satellite relative to the UE at the time ti. The determination may be in form of information received from a base station which calculated the position pos before. Alternatively, the position pos is estimated in the UE from time, measurements and knowledge about satellite trajectories etc.

Together with the previous step or separate from that the UE determines a progression of the position pos for the upcoming time span. This determining may be simply by looking up a pre-defined function for position progression, by parameterization of a pre-defined function with parameters received from the base station or measurements done by the UE itself. The progression of the position pos(t) may be determined in the form of a function dependent from the time t (as in the example of FIG. 9), from an angle of the UE-to-satellite line over horizon or by similar techniques.

The UE now applies the measurement configuration configured for the current time (t) until a handover to another satellite occurs in which case the UE may re-perform the determination of the current satellite position, now for the target satellite of the handover. This step ensures that after a handover the same measurement configuration is used based on a newly determined position of the new satellite's trajectory relative to the UE.

The blocks shown in FIG. 9 describe the measurement configuration and position determination for a single satellite. As described before in this invention, a measurement configuration may comprise measurements and reporting triggers for multiple satellites, e.g. on different orbits. In that case similar blocks would be performed for further satellites and the loop-back to the re-determination step may occur whenever a new satellite on the same orbit is taking the role of a former satellite as a serving or a neighbour satellite whose signals need to be measured by the UE.

The estimation of the position of the satellite relative to a UE on this path can use either of the following examples. In the following, we only describe qualitative values and derivation techniques without proving exact formulae. Also, all of the following can use the above-mentioned position specification as an angle, a time, a fraction or other alternatives.

The estimation of the position may be done using information about the exact position of a satellite and a UE, e.g. using global navigation satellite systems (GNSS) like GPS or GLONASS for UE positioning and trajectory information and time for satellite positioning. Both pieces of information, either available in the UE or in the base station, are sufficient to calculate a relative position. This is relatively straightforward but the use of GPS and exact knowledge of satellite trajectories is also relatively resource consuming.

Another example for the estimation is based on RSS measurements from multiple satellites and some knowledge of a relative position of the measured satellites. Satellites may broadcast an identity information, e.g. in their system information, that provides indication of an order of the satellites on an orbit (index m in FIG. 2) and/or the orbit, the respective satellite belongs to (index n in FIG. 2). The comparison of two measurements performed by a UE on distinct downlink signals of different satellites that are known to be in different orbits shifted by one half flyover period (or 4.5 minutes in our LEO satellite examples) or any other fraction may then lead to a good estimation of the position of either of the satellites. With reference to FIG. 5, measuring e.g. a maximum expected RSS from satellite$_{n,m}$ and a low but detectable RSS from satellite$_{n+1,m+1}$, a UE may estimate the position of satellite$_{n,m}$ to be at 270 s in the period shown in FIG. 5. In contrast, a mid-level RSS from satellite$_{n,m}$ and no detectable RSS from satellite$_{n+1,m+1}$ (but detectable RSS from satellite$_{n+1,m}$) may indicate a position in a range between 60s and 70s. Of course, real measurements may lead to more exact time values than the estimated ones explained above, e.g. seconds or fractions thereof.

The example above may be enhanced by measuring RSS differences of two successive measurements with a certain timely distance. A satellite of rising RSS can be expected in the first half of its flyover and a degrading RSS may point to the second half. More precisely, the exact difference together with the absolute value may contribute a precise estimation of the relative position of the satellite to the UE.

Figure 6:
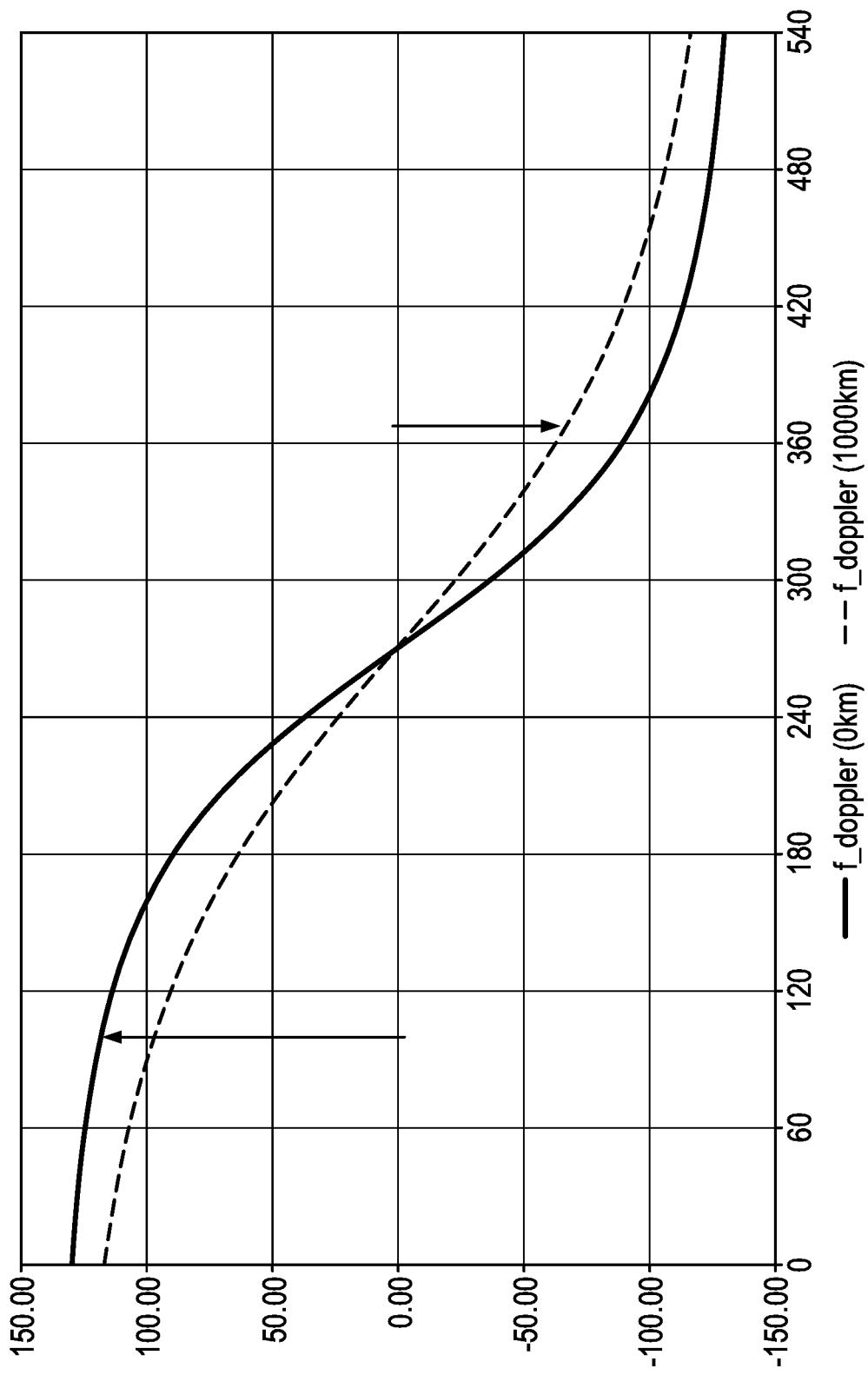
FIG. 6 illustrates the Doppler effect in connection with satellite communication.

Another example for the estimation is based on measurement of the Doppler frequency, i.e. measurement of the frequency deviation between the received signal and the transmitted signal caused by the relative speed of satellite and UE. Using the Doppler frequency is beneficial, as it is resistant against environmental effects like fast fading and scattering. For the LEO satellite examples used throughout this invention, FIG. 6 shows the Doppler frequency in kHz for a flyover period for a ground-based UE exactly on the satellite orbit plane (solid line) and for a UE which is 1000 km apart from the satellite orbit plane (dashed line). The Doppler frequency is shown for a carrier frequency of 2 GHz, other carrier frequencies would show linear deviations with respect to FIG. 6. As apparent, the Doppler frequency has high values of about 80 kHz with respective opposite signs at the beginning and the end of a flyover period. In the phase of a steep angle between UE and satellite (i.e. the Satellite is in UE's zenith), the Doppler frequency falls quickly from +60 kHz to −60 kHz. Using a Doppler frequency measurement is a good indication of the relative position of the UE and the satellite. Using multiple Doppler frequency measurements to estimate a change would even increase the position estimation accuracy.

Combining the two described methods of position estimation using RSS and Doppler frequency may further increase accuracy. One way of combination would be to first detect which measurement to use for an estimation based on a multiple RSS and multiple Doppler frequency measurements. A significant change of the RSS measurement may indicate the beginning or end of a flyover period where RSS changes provide the best results in combination with the sign of the Doppler frequency while a significant change in the Doppler frequency may indicate the middle of a flyover period where that measurement provides best results. Based on that detection, the respective measurements are used for a position estimation. Another way of combining would be to first use the Doppler frequency and/or its changes of two satellites to estimate the position of the satellites on their flyover period and after that use RSS and/or its changes to more accurately calculate the position including a distance of the UE to the satellite orbit which cannot be estimated from Doppler frequency measurements because that distance does not make a significant difference to the Doppler frequency as depicted in FIG. 6.

Additionally, for detection of the orbit a detected satellite is in, either of RSS and Doppler frequency may be used, or a combination thereof, together with some knowledge about satellite trajectories. If a shift in period between satellites of two neighboured orbits is known, e.g. a shift by half a flyover period, then the sign of the Doppler frequency and its inclination may be sufficient to identify which satellite is on which orbit and at what phase of a flyover.

Another measurement that may be available in the UE to estimate the relative satellite position is the angle of arrival (AoA) of a received signal from the satellite. As the orientation of the UE may not be known or may change over time, the AoA may be measured for different satellites and further knowledge of the trajectories of the satellites or further measurements of Doppler frequency and/or RSS may be used to estimate the satellite's angle over horizon with eliminated effects of UE movement.

Figure 7:
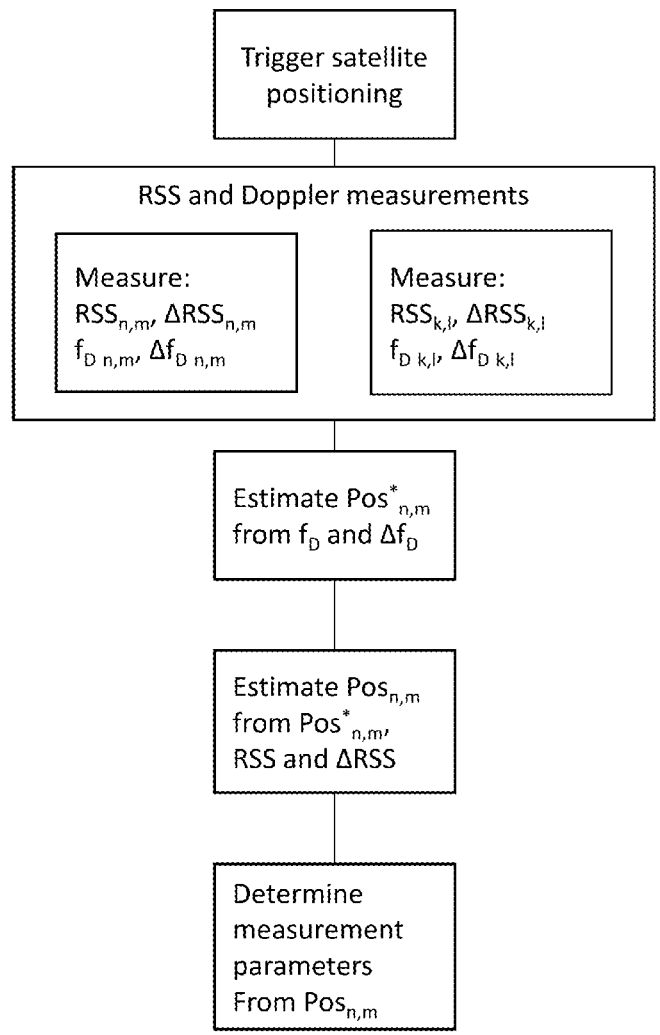
FIG. 7 illustrates an algorithm for determining a position estimation.

FIG. 7 depicts a functional flow of an example for positioning estimation in a UE. A UE may trigger satellite positioning autonomously, i.e. it may estimate a position of one or more satellites relative to the UE using a positioning method performed in the UE. The positioning may be based on measurements relating to the one or more satellites. FIG. 7 depicts a respective method for two satellites satellite$_{n,m}$ and satellit$_{l,k}$ being the satellites m and k on the orbits n and l, respectively. The orbits may be identical (n=l) and the satellites are neighbour satellites (k=m+1 or k=m−1) or the orbits are neighbours (l=n+1 or l=n−1) and the satellites are neighbours potentially shifted on their orbit against each other by a fraction of a period (k=m or k=m+1, assuming same index for near satellites on neighbour orbits).

The UE may for example measure RSS and Doppler frequency $f_D$ for satellite$_{n,m}$. Multiple such measurements at different times, e.g. separated by 1s or 5s, may be used to estimate an RSS and Doppler frequency inclination, denotes ΔRSS and Δ$f_D$ in FIG. 7. The same measurements may be done for satellite$_{k,l}$. Potentially the multiple measurements being performed time multiplexed with the multiple measurements for satellite$_{n,m}$, therefore the two satellite specific measurement blocks are shown in parallel in a single measurement box.

From the measurements based on the Doppler frequency, $f_{D\ n,m}$, $f_{D\ k,l}$, Δ$f_{D\ n,m}$ and Δ$f_{D\ k,l}$, and potentially available information about the position of the two respective satellites relative to each other, the UE performs a first position estimate of the positions Pos*$_{n,m}$ and potentially Pos*$_{l,k}$, the latter not shown in the figure as the measurements may be used to only estimate the position of a single satellite. This estimate may be based on a pre-known relation similar to that of FIG. 6. Example wise the UE may have measured two samples of $f_D$ for each of the two satellites with the values 118 kHz/117 kHz (from satellite$_{n,m}$) and −69 kHz/−71 kHz (from satellite$_{k,l}$), respectively. With the knowledge that two satellites on different orbits are separated by half a flyover period, i.e. 270 s, a lookup on a curve as depicted on FIG. 6 (or similar data representation in the UE) will lead to satellite$_{n,m}$ being at a position of t=100s and satellite$_{l,k}$ being at 270s, depicted by arrows in the FIG. 6. If the UE at that point does not already know its distance to the two orbit planes, the Doppler measurements will not provide a very accurate estimation. As FIG. 6 shows, very small measurement errors may lead to a big deviation of the distance as between the Doppler frequency curves of solid line and dashed line lay 1000 km distance.

Figure 8:
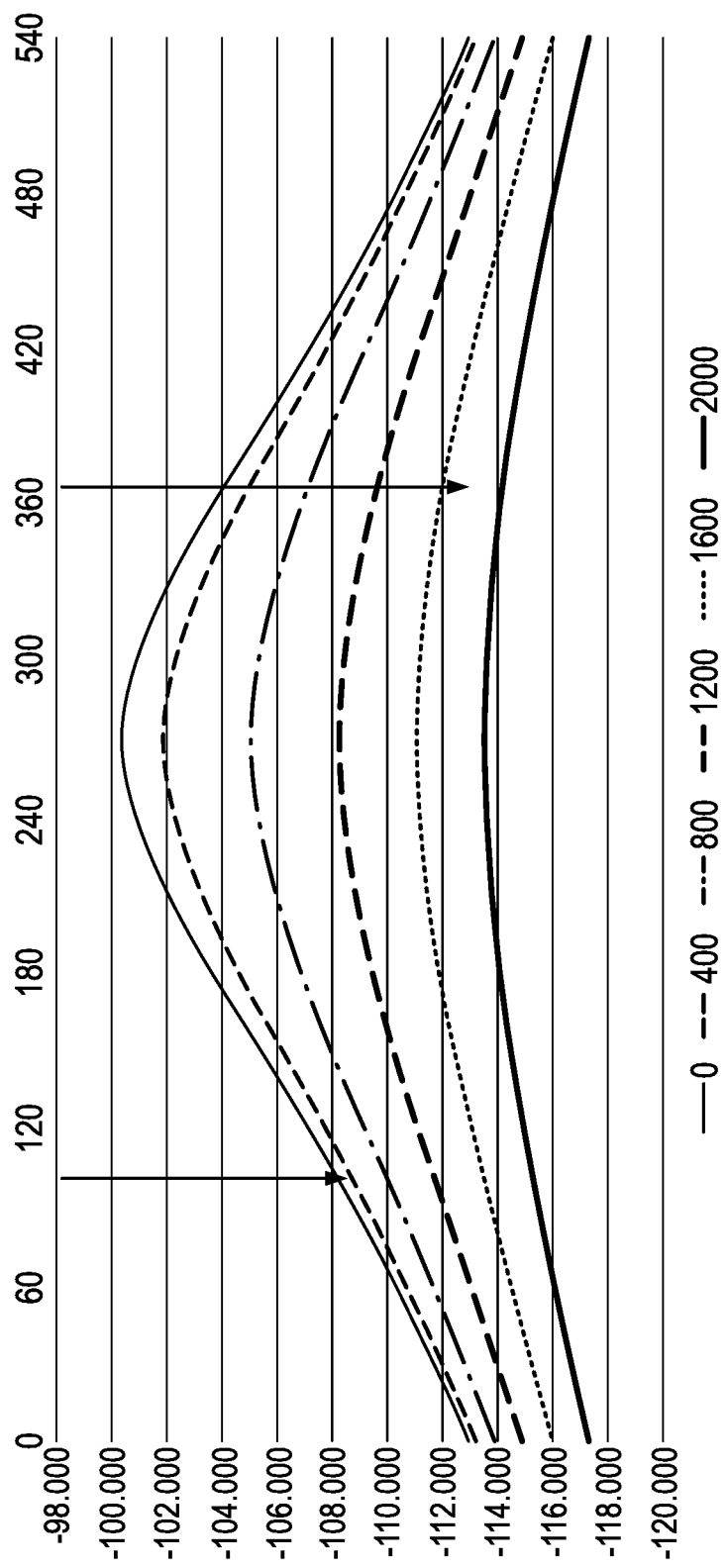
FIG. 8 illustrates a use of Doppler shift to determine a position.

Therefore, in another step shown in FIG. 7, the UE calculates more accurate positions $Pos_{n,m}$ and potentially $Pos_{l,k}$, the latter not shown, taking into account the RSS. Assuming measurements of −108 dBm and −113 dBm for the two respective satellites, the UE can take the estimation based on the Doppler frequency into account to lookup pre-known data for expected RSS of different satellites based on the distance between UE and orbit plane and on the position in the flyover period. In the given example, a lookup according to FIG. 8 may take place with the different curves representing the expected RSS at different distances from the orbit plane. The measured RSS values in conjunction with the estimated positions of the respective satellites point to two curves, one for a distance of 400 km and one between 1600 km and 2000 km. In a non-optimal example where measurements would deviate due to measurement errors, the UE could use additional information of the latitude of its position, e.g. that the total distance of two neighbouring orbit planes is known, e.g. 2000 km. In that case, the sum of distance of UE to each of two neighbouring orbit planes must be 2000 km so that measurement errors may be eliminated or reduced.

As shown, according to FIG. 7 with pre-knowledge about expected RSS and Doppler frequency progression and the geometry of the satellite trajectory, the UE may estimate the relative position of a satellite and use the information to apply the correct configuration parameters, e.g. as described before in relation to a UE measurement configuration.

In another embodiment, not supported by any specific figure but related to the aspects depicted in FIGS. 1 to 7, a UE may receive a measurement configuration from a base station which is applied by the UE performs autonomous cell selection or cell re-selection. This is usually the case when the UE changes to Idle Mode, e.g. after a period of inactivity or after loss of connectivity. A UE may have received a general measurement configuration based on one or two recurring trajectories of satellites in one or two orbits, respectively. The UE may also have information relating to the periodicity of the measurement configuration cycle or in other words about the timely distance of two satellites in the same orbit and/or an offset of satellites in a neighbouring orbit. The UE may also gain information about satellite movements through other means than a measurement configuration, e.g. system information broadcasted by a satellite, almanac information received from a server, etc.

The UE may then apply the measurement configuration or information based on time, i.e. the UE knows that every n seconds or minutes the next satellite of an orbit appears at the horizon and every k seconds or minutes later, a satellite of the neighbour orbit appears. The UE may then adapt its autonomous cell reselection accordingly. The UE may for example measure the resources (frequency) of a neighbour cell (neighbour satellite) only, when it is known to be reachable, i.e. as long as a satellite is known to be out of reach from trajectory or configuration information, it is not searched for. On the other hand, as soon as it is known a satellite may be potentially better for the UE than the currently serving satellite, respective measurements are started or the periodicity of such measurements is increased.

The following is a summary of the main features of the various aspects of the invention with potential alternatives.

The term "configured" means a configuration received in a UE from a base station.

I. In a UE triggering transmission of a measurement report dependent on a pre-determined relative movement of a base station to a UE based on either of
  a measurement by the UE and comparison with a threshold, the threshold being time varying as a pre-determined function with or without configured parameters, or a configured function, or
  two measurements by the UE compared using an offset, the offset being time varying as a pre-determined function with or without configured parameters, or a configured function,
  the function being defined or parameterized as a function of time or as a function of a relative position of a base station to the UE or as a function of one or more measurements substantially representing the relative position of a base station to the UE The function could substantially map to a pre-determined change of the link between UE and the base station caused by the pre-determined relative movement of the base station to a UE.

The function could be defined or parameterized as a function of a relative position of a base station to the UE and the triggering of a measurement report depends on the function and an initial relative position of the base station to the UE determined by the UE or determined by the base station and provided to the UE on a configuration message.

The measurements could be based on measurements of at least one parameter of the link between the base station and the UE.

The base station could be part of a satellite and the relative movement of the base station to the UE is the movement of the satellite orbiting the earth over a ground-based UE.

A base station could comprise two parts, one part implemented in a ground station and another part implemented in a satellite and the relative movement of the base station to the UE is the movement of the satellite orbiting the earth over a ground-based UE.

The threshold or offset could be configured to have a first static value during a first period of time and the threshold is configured to have a second static value during a second period of time following the first period of time.

The threshold or offset could be configured as a continuous function of time with varying values.

The threshold or offset could be configured as a continuous function of at least one measurement measured by the UE, the at least one measurement substantially representing the relative position of the base station to the UE.

After a handover of the UE to a second base station, the threshold or offset could be reset based on the (unchanged) function and an initial relative position of the second base station to the UE determined anew (in the UE or the base station and provided to the UE).

In a UE changing the applied configuration for performance of measurements or measurement reporting from a first configuration to a second configuration dependent on the pre-determined relative movement of a base station to a UE, the first and second configurations having been received (from a base station) in the UE before or during application of the first configuration, wherein the second configuration comprises at last one of a measurement, a measurement report and a measurement reporting trigger that is not present in the first measurement report (and vice versa), or
  the first configuration comprises a measurement on a specified resource (time, frequency, signal, code) and the second configuration comprises the measurement on a different resource, or the first configuration comprises a measurement reporting trigger for transmission of a measurement report based on a first measurement and the second configuration comprises a measurement reporting trigger for transmission of a measurement report based on a second measurement different from the first measurement, or the first configuration comprises a configuration of a periodic measurement reporting with a first periodicity and the second configuration comprises a configuration of a periodic measurement reporting with a second periodicity different from the first periodicity.

The point in time for changing the applied configuration for performance of measurements could be determined as a function of a relative position of a base station to the UE or a function of one or more measurements substantially representing the relative position of a base station to the UE, The determination could be performed in the UE, or performed in a base station and provided to the UE in a configuration message.

The point in time of changing the applied configuration of measurements or measurement reporting could be based on the function and an initial relative position of the base station to the UE determined by the UE based on measurements or determined by the base station and provided to the UE on a configuration message.

The current position could be determined based on measurements of at least one parameter of a link between UE and the base station.

The base station could be part of a satellite and the relative movement of the base station to the UE is the movement of the satellite orbiting the earth over a ground-based UE.

A base station could comprise two parts, one part implemented in a ground station and another part implemented in a satellite and the relative movement of the base station to the UE is the movement of the satellite orbiting the earth over a ground-based UE.

After a handover of the UE to a second base station, the applied configuration for measurements or measurement reporting could be reset to the first configuration and the point in time for a change from the first configuration to the second configuration is determined (anew) based on measurements of at least one parameter of the link between the UE and the second base station.

The measurements of at least one parameter of a link between UE and base station could comprise one of measuring the Doppler frequency of the link, or the difference of two or more measurements of the Doppler frequency of the link at different time instances, or the received signal power of the link, or the difference of two or more measurements of the received signal power of the link at different time instances, or the angle of arrival of a signal received on the link, or the angle of arrival of a first signal received on the link and a second signal received on a second link between the UE and another base station.

The same could be applied for addition or release of an additional carrier to a second satellite while an existing carrier to first satellite remains based on time or measurements as described for the above measurements.

The invention claimed is:

1. A method of operating a user equipment, UE device in communication with a non-terrestrial communication system comprising a plurality of transmission points, the method comprising:
  in the UE device triggering a transmission of a measurement report dependent on a measurement by the UE device of a received signal parameter of a signal received from a transmission point of the system and a comparison of the measured parameter with a threshold, the threshold being a predetermined time-variant function dependent on a time-dependent expected position of the UE device with respect to the transmission point; and
  transmitting the measurement report.

2. The method according to claim 1, wherein the threshold may be adapted following configuration information received from the communication system.

3. The method according to claim 1, wherein measurement reports are sent for a plurality of transmission points, with for each transmission point a comparison being made between a received signal parameter from that transmission point and a pre-determined time varying function for that transmission point.

4. The method according to claim 1, wherein the measurements are made at a predetermined periodicity, the predetermined periodicity varying with time.

5. The method according to claim 4, wherein the periodicity varies in a manner dependent on a position of the transmission point relative to the UE device.

6. The method according to claim 4, wherein the periodicity varies in a manner dependent of a position of a second transmission point relative to the UE device.

7. A user equipment, UE, device capable of communicating with a satellite communication system, the UE device being adapted to generate measurement reports, wherein the UE device is arranged to perform a comparison of a received signal strength with a time varying threshold value in order to determine whether a measurement report is to be sent, the time varying threshold value varying according to a predetermined time-variant function dependent on an expected change in position of a satellite of the satellite communication system.

8. The UE device according to claim 7, wherein the UE device is arranged to receive information from the communication system, the information indicating a period of time in which the UE device should perform a comparison between a received signal strength of a signal received from a first satellite and a received signal strength of a signal received from a second satellite.

9. The UE device according to claim 7, wherein the UE device is arranged to receive configuration information from the communication system, the configuration information indicating to the UE device the measurement reporting which the UE device is required to perform.

10. The UE device according to claim 7, wherein the UE device is arranged to use an estimate of a position of the UE device to determine a current value for the threshold value for comparison with the received signal strength.

11. The UE device according to claim 10, wherein the UE device is arranged to determine the estimate of position using signals received from the satellites of the communication system.

12. A method for a non-terrestrial communication system to control a handover of a user equipment, UE, device from a first transmission point to a second transmission point, the method comprising:
  providing the UE device with configuration information for performing measurement reporting;
  instructing the UE device to perform measurement reporting by comparing a measurement of a signal received from the first transmission point with a time varying threshold, the time varying threshold varying according to a pre-determined time-variant function dependent on a time-dependent expected position of the UE device with respect to the first transmission point;

receiving from the UE device measurement reports in accordance with the configuration information; and in an event of a determination based on the measurement reports that a handover from the first transmission point to the second transmission point would be beneficial, issuing a handover command to the UE device.

* * * * *